P. L. T. HÉROULT.
REGULATING ELECTRIC FURNACES.
APPLICATION FILED JAN. 21, 1909.

1,061,612.

Patented May 13, 1913.
2 SHEETS—SHEET 1.

WITNESSES:
Fred White
René Bruine

INVENTOR:
Paul Louis Toussaint Héroult,
Attorneys.

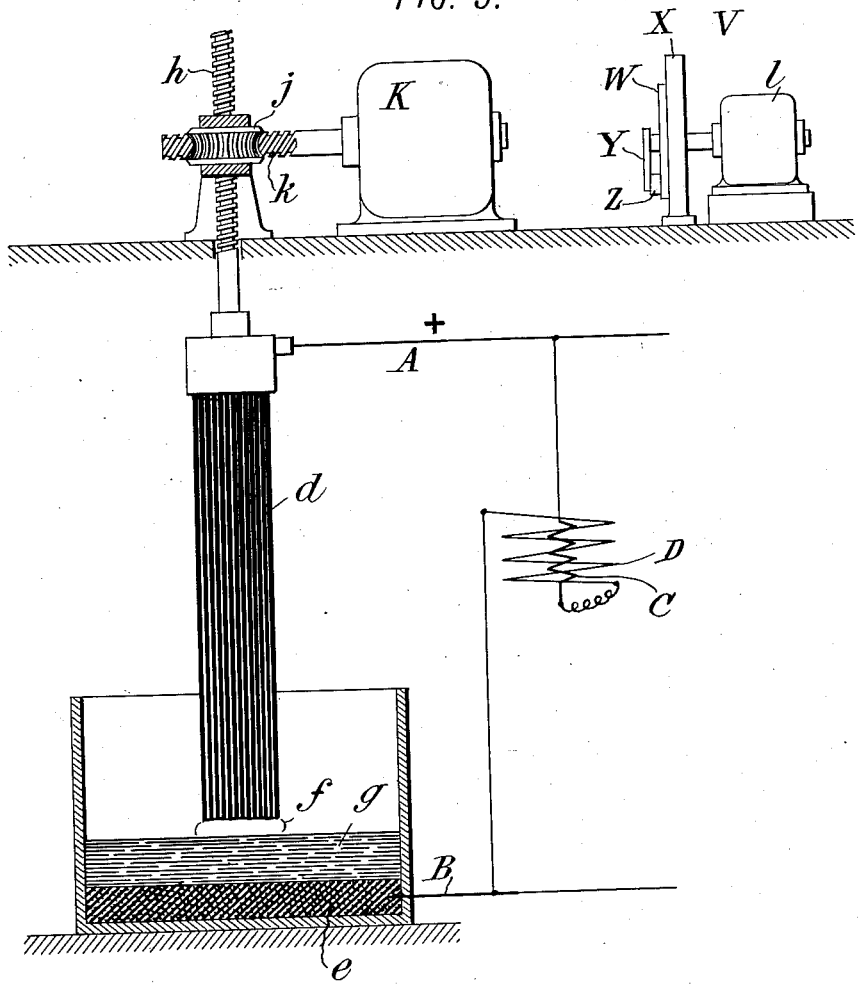

UNITED STATES PATENT OFFICE.

PAUL LOUIS TOUSSAINT HÉROULT, OF LA PRAZ, SAVOIE, FRANCE, ASSIGNOR TO SOCIETE ELECTRO-METALLURGIQUE FRANCAISE, OF FROGES, FRANCE.

REGULATING ELECTRIC FURNACES.

1,061,612.  Specification of Letters Patent.  Patented May 13, 1913.

Application filed January 21, 1909. Serial No. 473,573.

*To all whom it may concern:*

Be it known that I, PAUL LOUIS TOUSSAINT HÉROULT, a citizen of the Republic of France, residing at La Praz, Savoie, France, have invented certain new and useful Improvements in Regulating Electric Furnaces, of which the following is a specification.

My invention aims to provide an improved apparatus for the regulating of electric furnaces or the like. It is common to control such furnaces by means of a double coil the terminals of which are connected to the opposite terminals of the furnace, and which coil by the movement of one of its parts relatively to the other, actuates a device which causes the passage of a current in one direction or another through a regulating circuit, which in turn controls a motor which brings the parts of the furnace back to the desired condition of regulation. Various styles and modifications of this regulating apparatus have been proposed and used, and in connection with various styles of furnace. In all such previous regulating apparatus of which I am aware, it has been proposed to correct the error entirely and continuously. This method of operation has resulted in an excessive movement of the parts by reason of their momentum so as to create an error in the opposite direction, thus resulting in a continual swinging of the parts back and forth past the point of perfect regulation. According to the present invention I propose to avoid or reduce this objection by correcting the error and bringing the parts of the furnace back to their proper relative positions little by little or step by step, with a sufficient interval between the steps to enable the new position of the furnace to have its effect upon the regulating apparatus; so that the regulating apparatus is informed so to speak whether or not there is need for further regulation, and if not, is brought to or remains in the neutral position. The invention provides also means for regulating the steps and the intervals between them so as to determine the conditions of best efficiency for the regulating apparatus as a whole.

The accompanying drawings illustrate an embodiment of the invention.

Figure 1:
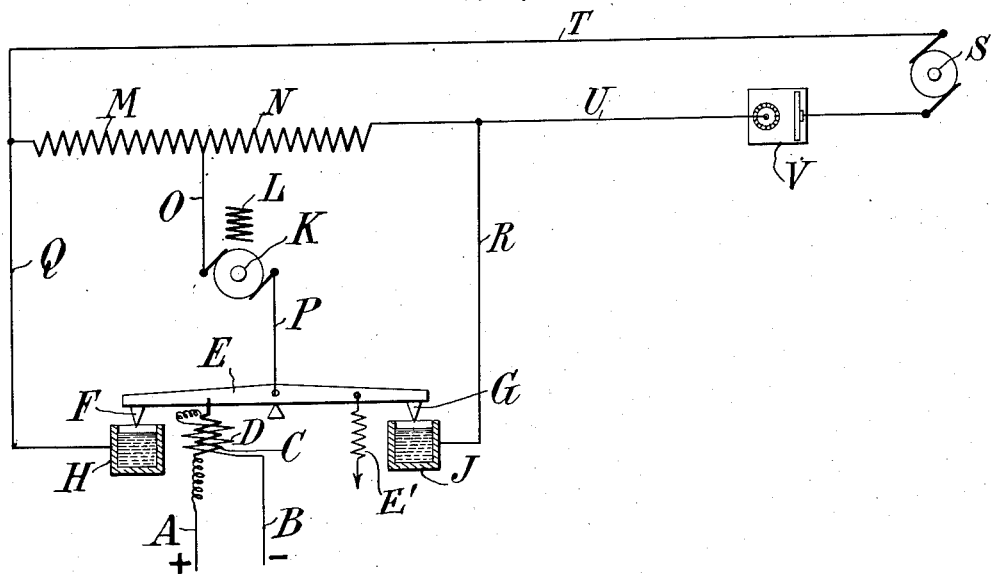
Figure 2:
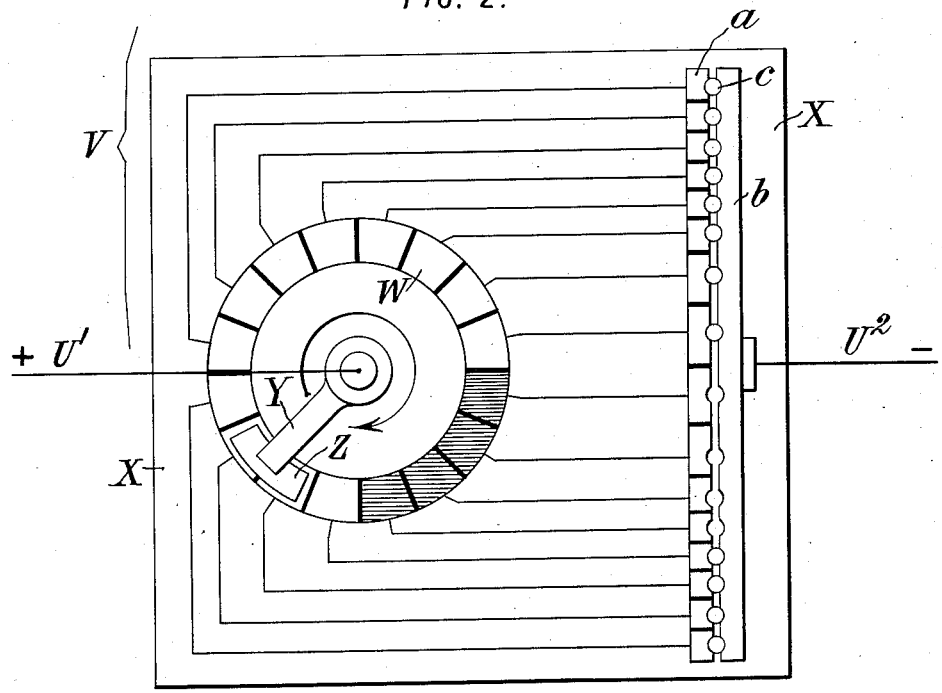

Figure 1 is a diagrammatic view of the electrical connections, and the locations of the several parts of the complete regulating apparatus; Fig. 2 is a face elevation of the step by step mechanism with the adjusting means therefor; Fig. 3 is a sectional view of the furnace with the controlling mechanisms of the regulating apparatus in elevation, the electric circuits being omitted for the sake of clearness.

The wires A B are parts of the furnace circuit, and are connected to a movable heavy coil C within a fixed lighter coil D, the movable coil being mechanically connected to a lever E having at its ends contacts F and G which fit into mercury cups H and J. The variations in the current through A and B cause a movement of the movable coil C by a solenoid action and the movement of the coil C is communicated to the lever E. The movement of the lever E in one direction or another regulates the furnace correspondingly by making the contact F H or G J. When the regulation is perfect neither of these contacts is made. A spring E' pulls the opposite end of the lever downward when released by the coils. The actual movement of the parts of the furnace necessary for regulation, is effected by means of a motor K, the field coil of which is indicated at L, and the armature resistance of which is divided into two parts M and N, both of which are connected by means of wires O and P to the lever E of the regulating apparatus; the coil M being connected by a wire Q with the mercury cup H, and the coil N by a wire R with the mercury cup J. The motor is driven from a generator S whose terminals are connected, through T to the armature resistance M and mercury cup H, and through U to the armature resistance N and mercury cup J.

The apparatus thus far described is a well known form of regulating apparatus. If the voltage or amperage of the furnace becomes too high, one end of the lever E is depressed. Say the end carrying the contact F. The regulating circuit is then through the wires T and Q, contacts H and F, lever E, wire P, armature circuit, wire O, and resistance N and wire U, causing a rotation of the armature in what we may call a positive direction. When the regulation in the positive direction has been carried too far, the contact G dips into the mercury cup J and the current is by way of the wire T, resistance M, wire O, armature circuit, wire P, lever E, contacts G and J, and wires R and U, causing a rotation of the armature in the negative direction. It is customary to provide a dash-pot of some sort upon the lever E, but even with this precaution the momentum of the various parts which have to be moved, including especially the lever E and the motor K and the parts of the furnace, is so great that after bringing the furnace to the desired condition of regulation and restoring the lever E to its middle or inoperative position, the regulation is continued beyond the desired position, thus swinging the lever E in the opposite direction and causing a regulating movement in the reverse direction; so that the apparatus comes to the position of rest by a series of oscillations past the point of perfect regulation. The parts of the furnace are therefore seldom perfectly regulated, since in its natural operation variations occur frequently so as to set the regulating mechanism frequently in oscillations which are comparatively long continued. In order to avoid this oscillating movement backward and forward past the desired condition of regulation, I propose to introduce a device by which the movable parts of the furnace are brought to the desired position by a series of impulses between which is a more or less brief interval of time; so that when at last they reach the desired position of regulation and set the regulating apparatus in its neutral position, there will be no substantial momentum of the mechanism tending to carry the parts of the furnace beyond this position. For example with a regulating apparatus which operates by changing the course of the current in a regulating circuit, such as that above described, I propose to introduce at any suitable point in the circuit an interrupter so as to convey the current to the motor in a series of intermittent impulses. Such an apparatus is indicated as a whole at V (Fig. 1) and may be inserted at any point in the regulating circuit which is common to both the forward and the backward regulating currents. This interrupter comprises a ring of copper or other contacting segments W, mounted fixedly on an insulating plate X and insulated from each other; a rotating arm Y carrying a brush Z which passes over said segments W, said arm being connected to one branch U' of the circuit, the segments W being connected to the opposite branch $U^2$ of the circuit, and means being interposed for cutting any desired number of the segments W out of the circuit. The ring upon which the brush Z travels might be permanently made up partly of a conducting portion and partly of a non-conducting portion, so that as the brush passes over the conducting portion the current will pass over the non-conducting portion of the ring, and the operation of the motor will stop as soon as its momentum is overcome, even though the condition of the furnace and the regulating apparatus calls for a continued movement of the motor in the same direction. Preferably however the ring is made up of separate segments W as explained, any desired number of which can be cut out of the circuit so as to render them practically non-conducting, and so as to increase or diminish the interval during which the regulating motor is allowed to come to rest. This method of regulating increases the interval of actuation when the interval of rest is diminished, and vice versa. Both intervals might be simultaneously increased or diminished by increasing or diminishing the speed of rotation of the arm Y, and in fact various other methods may be used for securing these adjustments of the intervals.

For cutting out the segments W, they are connected respectively to contact blocks $a$ mounted upon the non-conducting plate X and insulated from each other, and arranged in a line opposite a conducting bar $b$ which is directly connected to the wire $U^2$. Plugs $c$ may be inserted or withdrawn between the common bar $b$ and the several contacts $a$, the plugs being omitted from the contact plates $a$ corresponding to the segments W which are to be left out of the circuit. Instead of the arrangement of contacts $a$ and $b$ and plugs $c$ shown, any other devices might be used for cutting desired segments W out of the circuit.

In Fig. 3 is shown an arc furnace having an electrode $d$ which is connected to one end A of the operating circuit, and a carbon plate $e$ which is connected to the other end B of said circuit. The arc $f$ is lengthened by the burning away of the electrode, or shortened by the rising of the molten product $g$, necessitating a lowering or lifting of the electrode which is accomplished by a threaded shaft $h$ passing through a nut $j$ which is supported upon a floor above the furnace, and which is rotated by means of a worm shaft $k$ driven by the regulating motor K. I have shown on the same upper floor the interrupter V actuated by a small motor $l$.

What I claim is:—

1. An apparatus for regulating electric furnaces or the like, including in combination a regulating circuit for bringing the furnace to the desired operation, and means for changing the course of the current in said circuit and holding it continually in its course until the regulation is effected, and an interrupter in said circuit for causing said current to pass intermittently.

2. An apparatus for regulating electric furnaces or the like, including in combination a regulating circuit for bringing the furnace to the desired operation and means for changing the course of the current in said circuit, an interrupter comprising a number of segments interposed in succession in the circuit, and means for breaking the connections of said segments separately.

3. An apparatus for regulating electric furnaces or the like, including in combination a regulating circuit for bringing the furnace to the desired operation and means for changing the course of the current in said circuit, and an interrupter comprising a rotating ring of sectors W connected to one branch of said circuit, an arm Y connected to the other branch thereof and carrying a brush Z overlying said segments, means for rotating said arm, and means for disconnecting some of said segments W.

In witness whereof I have hereunto signed my name in the presence of two subscribing witnesses.

PAUL LOUIS TOUSSAINT HÉROULT.

Witnesses:
DOMINGO A. USINA,
THEODORE T. SNELL.